US012783791B2

(12) United States Patent
Pourroy et al.

(10) Patent No.: US 12,783,791 B2
(45) Date of Patent: Nov. 3, 2026

(54) SYSTEM AND METHOD FOR MODIFYING TEXTUAL CONTENT

(71) Applicant: Shopify Inc., Ottawa (CA)

(72) Inventors: Sean Pourroy, Galway (IE); Greg Dodd, Almonte (CA); Siri Rosendahl, Galway (IE); Ana Sofia Pena de Castro Maia, Boston, MA (US)

(73) Assignee: Shopify Inc, Ottawa (CA)

( * ) Notice: Subject to any disclaimer, the term of this patent is extended or adjusted under 35 U.S.C. 154(b) by 169 days.

(21) Appl. No.: 18/422,332

(22) Filed: Jan. 25, 2024

(65) Prior Publication Data

US 2025/0245421 A1 Jul. 31, 2025

(51) Int. Cl.

*G06F 40/166* (2020.01)
*G06F 40/103* (2020.01)
*G06F 40/232* (2020.01)
*G06F 40/253* (2020.01)

(52) U.S. Cl.

CPC .......... *G06F 40/166* (2020.01); *G06F 40/103* (2020.01); *G06F 40/232* (2020.01); *G06F 40/253* (2020.01)

(58) Field of Classification Search

CPC ..................................................... G06F 40/166
See application file for complete search history.

(56) References Cited

U.S. PATENT DOCUMENTS

2023/0274094 A1* 8/2023 Tunstall-Pedoe et al. .................. G06F 40/40
2024/0378399 A1* 11/2024 Gandhi et al. .......... G06F 40/40
2025/0077487 A1* 3/2025 Groenewegen et al. .................... G06F 16/215

* cited by examiner

*Primary Examiner* — James J Debrow
(74) *Attorney, Agent, or Firm* — CPST Intellectual Property Inc.; Brett J. Slaney

(57) ABSTRACT

A system and method are provided for dynamically modifying textual content by applying a text analysis tool and selectively using a large language model (LLM). The method includes applying a text analysis tool to text having been added to a document, identifying a portion of text in the document as violating a rule in a rule set associated with the document, and providing a first input to a large language model (LLM). The first input comprises at least one prompt requesting a revision to the portion of text in the document. The method also includes receiving, from the LLM, a response to the first input, the response comprising a suggested modification to the document related to the portion of text; and providing an option to apply the suggested modification to the document.

20 Claims, 12 Drawing Sheets

SYSTEM AND METHOD FOR MODIFYING TEXTUAL CONTENT

TECHNICAL FIELD

The following relates generally to modifying textual content and, in particular, to dynamically modifying textual content by applying a text analysis tool and selectively using a large language model (LLM).

BACKGROUND

In writing technical documentation or computer code, adhering to specific stylistic guidelines or established domain-specific practices may be an important constraint. The rules or guidelines that govern these practices can range from syntax, spelling, and grammar rules to specific formatting requirements.

BRIEF DESCRIPTION OF THE DRAWINGS

Embodiments will now be described with reference to the appended drawings wherein.

DETAILED DESCRIPTION

Figure 1:
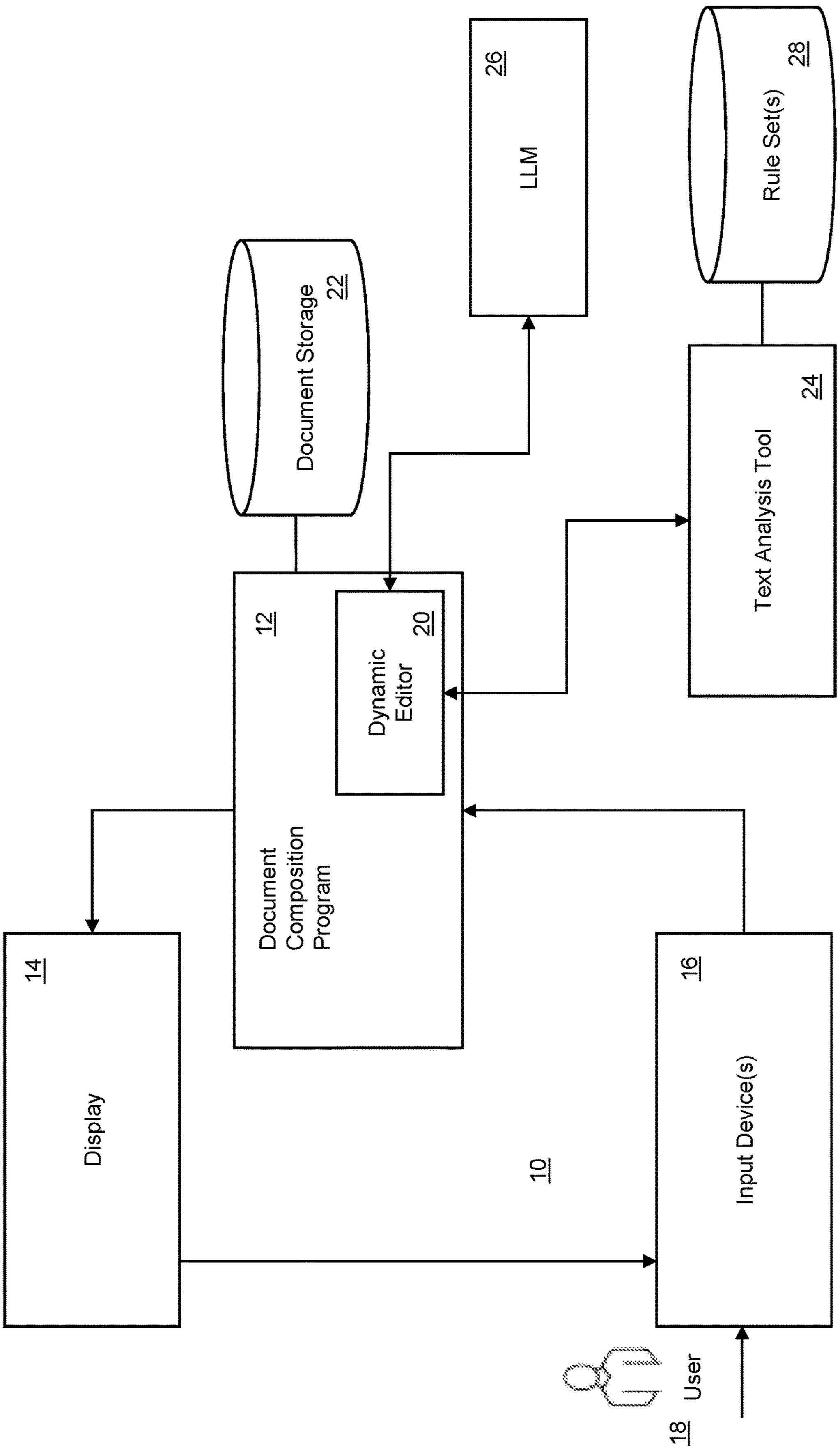
FIG. 1 is an example of a computing environment in which a document composition program is provided with a dynamic editor having access to a text analysis tool and a LLM.

Current document composition editor tools may be limited to identifying violations in the document composition process by detecting spelling, grammar, and syntactical errors. Additionally, once violations have been identified, corrections that are suggested may be limited, for example, to simple spelling or grammar fixes.

It is recognized that existing solutions may not offer customizability. For example, violation detection logic used by an editor tool may not automatically be updated based on updated policy guidelines and, equally, corrections relevant to the guideline violations may not be available to be applied to the content.

LLMs may be utilized to correct documents based on prompts generated based on a guideline policy. However, using LLMs to provide a user with real time feedback during document composition may be highly resource intensive. This may be due to a requirement to parse the entire document for potential violations on each entry of a character, word, line etc. For example, a LLM may be prompted with the entire content of text being composed as of the time the LLM has been prompted. This text would then be analyzed by the LLM according to a set of rules or a model developed for the document composition process. However, parsing the entire content of the document by the LLM as text is added may slow down the program while the program separately queries the LLM to either parse the new text out of context or re-parse the entire content including the new text (to include context). If one expects that at least some of the text being added does not include a violation of a rule set, parsing all content using a LLM on a continuous basis amounts to a brute force approach that is slow, computationally expensive, and may not be necessary.

Moreover, the effectiveness of an LLM may be compromised if the LLM rephrases sections of the document that are meant to retain their original format. Furthermore, providing appropriate instructions to the LLM based on the type of violation can lead to poor output due to the wide variety of potential violations and the tendency of LLMs to "hallucinate" when provided with too much context.

To address these challenges, a text analysis tool (e.g., linter or other code analysis tool) may be used with a LLM to identify and correct violations during document composition. The text analysis tool may operate during document composition to detect and highlight violations and, when appropriate, provide an option to selectively prepare and feed LLM instructions in order to query the LLM and determine relevant corrections in response. The LLM may, additionally or alternatively, be queried and responses applied automatically.

The proposed solution integrates a real-time text analysis tool with a LLM to identify and correct rule or guideline violations during the document composition process. In this example, the linter identifies specific portions of the written content that violate the rules or guidelines, as well as the type of violation. Based on the identified violation, the system selects appropriate instructions to generate an input to be used to prompt the LLM. This input (e.g., a set of LLM prompts) may vary depending on the type of violation, allowing for a tailored approach to each unique scenario. Optionally, the LLM, due to its understanding of the content already written, may predict possible endings for a section of the document. This predictive ability allows the LLM to inform the text analysis tool about potential future violations based on the current context, effectively enabling the text analysis tool to update its logic in real time.

In one aspect, there is provided a computer-implemented method, comprising: applying a text analysis tool to text having been added to a document; identifying a portion of text in the document as violating a rule in a rule set associated with the document; providing a first input to a LLM, the first input comprising at least one prompt requesting a revision to the portion of text in the document; receiving, from the LLM, a response to the first input, the response comprising a suggested modification to the document related to the portion of text; and providing an option to apply the suggested modification to the document.

In certain example embodiments, the text analysis tool is applied continuously, periodically, or responsive to a second input during document composition.

In certain example embodiments, the method further includes applying the suggested modification to the document.

In certain example embodiments, the suggested modification is applied responsive to a third input confirming the suggested modification.

In certain example embodiments, the method further includes applying the text analysis tool to the suggested modification to confirm that changes comply with the rule set.

In certain example embodiments, the method further includes revising the first input to the LLM; receiving a revised modification; and applying the text analysis tool to the revised modification to confirm that changes comply with the rule set.

In certain example embodiments, the method further includes receiving a request from the LLM for additional content associated with the portion of text; and supplementing the input with the additional content.

In certain example embodiments, the method further includes updating the rule set based on the suggested modification.

In certain example embodiments, the method is executed asynchronously to document composition.

In certain example embodiments, the method further includes identifying one or more portions of text in the document; and providing a corresponding option with each portion to obtain the suggested modification from the LLM.

In certain example embodiments, the portion of text is highlighted inline and detecting selection of the highlighted text causes the text analysis tool to display the corresponding option.

In certain example embodiments, a plurality of corresponding options is displayed, each option providing a different suggested modification.

In certain example embodiments, the modification to the document comprises a replacement for the portion of text.

In certain example embodiments, the modification to the document comprises content additional to the portion of text.

In certain example embodiments, the method further includes providing content associated with the document composition process to the LLM; and receiving the rule set, the rule set having been generated by the LLM using the content associated with the document composition process.

In certain example embodiments, the method further includes receiving, from the LLM, a prediction for a new portion of text to be added to the document based on an analysis of the input.

In another aspect, there is provided a computer system comprising: at least one processor; and at least one memory, the at least one memory comprising processor executable instructions that, when executed by the at least one processor, cause the computer system to: apply a text analysis tool to text having been added to a document; identify a portion of text in the document as violating a rule in a rule set associated with the document; provide a first input to a LLM, the first input comprising at least one prompt requesting a revision to the portion of text in the document; receive, from the LLM, a response to the first input, the response comprising a suggested modification to the document related to the portion of text; and provide an option to apply the suggested modification to the document.

In certain example embodiments, the text analysis tool is applied continuously, periodically, or responsive to a second input during document composition.

In certain example embodiments, the computer system further includes instructions that, when executed by at least one processor, cause the computer system to: apply the suggested modification to the document.

In another aspect, there is provided a computer-readable medium comprising processor executable instructions that, when executed by a processor of a computer system, cause the computer system to: apply a text analysis tool to text having been added to a document; identify a portion of text in the document as violating a rule in a rule set associated with the document; provide a first input to a LLM, the first input comprising at least one prompt requesting a revision to the portion of text in the document; receive, from the LLM, a response to the first input, the response comprising a suggested modification to the document related to the portion of text; and provide an option to apply the suggested modification to the document.

An example embodiment for the process described herein relates to writing code to incorporate UI buttons. For example, a UI button may have a label and it could be difficult to determine whether it is a comment or instruction (e.g., "start meeting"). The text analysis tool may flag the text "start meeting" as a violation for not being bolded in the code (according to a corresponding rule), for instance. However, the flagged text may require additional context to make this determination, such as being paired with the term "click" (for desktop) or "tap" (for mobile) and/or text or code that precedes the flagged text. The text analysis tool, in combination with the LLM, may be required to accurately parse this portion of text and determine an appropriate modification such as whether to bold the text or not. Additional context in such a scenario may be provided by additional portions of text in the document or supplemental content such as manuals, guidelines, metadata, third party data, etc.

The text analysis tool may highlight the violation and provide an ability to select an option to correct the violation using a standard correction (e.g., using a linter only) or by prompting the LLM. Suggested corrections may be preemptively obtained or may require an input to prompt the LLM. For example, the text analysis tool may provide a standard suggestion which may be overruled by the user by selecting a separate option to use the LLM. Responses from the LLM may be applied automatically and may be recursively checked by the text analysis tool to avoid introducing new errors into any suggested modification.

The LLM may be used by the text analysis tool to generate the rule set, e.g., based on guidelines, style guides, or other content. These rule sets may be updated periodically, e.g., prior to use of the text analysis tool or following use of the LLM by learning new rules or modifying existing ones based on the suggested modifications.

An example workflow for the proposed solution using a linter is as follows:

1. User Input: The user begins to write a technical document or code in the document composition tool.

2. Real-Time Linting (i.e., without using the LLM): The integrated linter operates in real time in its usual way, scanning the text as it is written. It identifies any violations of the guidelines in the text.

3. Violation Identification: The linter flags the identified violation and highlights the specific portion of text that is in violation.

4. Instruction Selection: Based on the identified violation, the system selects the appropriate instructions to provide to the LLM.

5. LLM Prompting: The system prompts the language model with the selected instruction and the violating text.

6. LLM Output and Linter Update: The language model processes the prompt and outputs a suggested correction. Based on its understanding of the content and its prediction of possible endings, the LLM informs the linter about potential future violations, allowing the linter to update its logic accordingly.

7. Real-Time Feedback: The suggested correction is displayed in real time to the user as they continue to write. The user can then choose to accept the suggestion and correct the violation immediately.

Optionally, continued monitoring may occur where the linter, now updated with the new logic provided by the LLM, continues to monitor the user's writing in real time, ready to identify and flag any further guideline violations.

Figure 17:
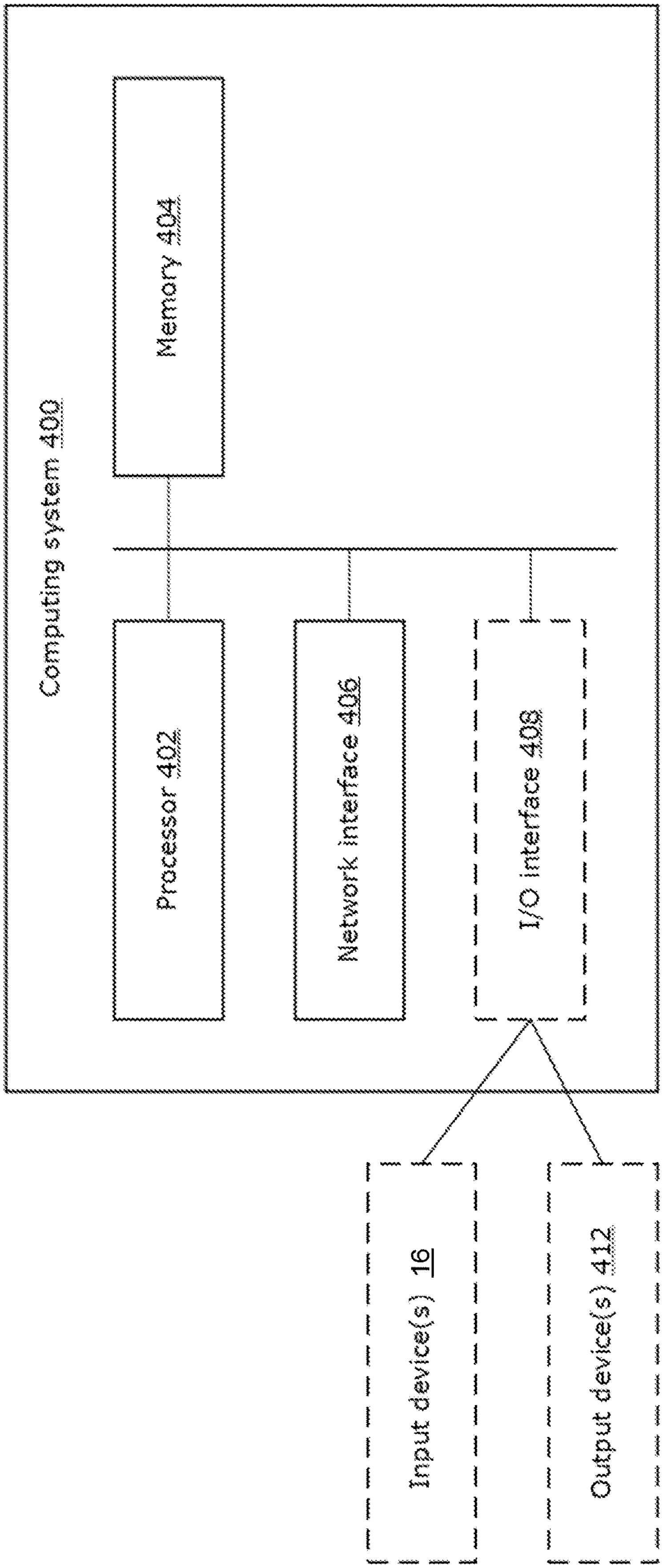
FIG. 17 is a block diagram of an example computing system, which may be used to implement examples of the present disclosure.

Dynamically Modifying Textual Content by Applying a Text Analysis Tool and Selectively Using a LLM Referring now to the figures, FIG. 1 illustrates an example of a computing environment 10 in which a document composition program 12 is provided by or with one or more computing devices or computing systems 400 (see FIG. 17). Such computing systems 400 (or computing devices) can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc. The document composition program 12 includes a dynamic editor 20 that may be a widget, tool, plug-in, function, script, or other computer program that is embodied as a stand-alone routine or may be integrated with the document composition program 12 to execute a dynamic editing process. In examples described herein, the dynamic editor 20 may, at least in part, utilize a text analysis tool 24 and/or a LLM 26 to determine violations of rules in one or more rule sets 28 that relate to a document composition process.

For example, a rule set 28 may dictate syntax, formatting, guidelines, spelling, grammatical, or other rules associated with text that has been and/or is being added to the document composition program 12. The dynamic editor 20 may be configured to run periodically (e.g., continuously) while a document is being composed in the document composition program 12 or selectively based on an input. In the present disclosure, the term "document" may refer to any electronic matter that provides a record of electronic content that includes textual content. Examples of documents as used herein may include computer code, user manuals, manuscripts, letters, memos, reports, logs, chronicles, files, archives, catalogs, registers, etc. Such documents may be subjected to one or more of the rule sets 28 that specify rules or other guidelines for the formatting, structure, syntax, form, etc. of the document and/or the document composition process.

The document composition program 12 may take the form of a desktop-type application, a mobile-type application (also referred to as an "app"), an embedded application in customized computing systems, or an instance or page contained and provided within a web/Internet browser, to name a few. The dynamic editor 20, while shown as part of the document composition program 12, may instead be provided by a separate computing device or computing system 400 used to run the document composition program 12. Likewise, while shown as separate entities in FIG. 1, the text analysis tool 24 and the LLM 26 may be integrated with the document composition program 12 and/or dynamic editor 20 and may be provided on the same or separate computing systems 400. As such, the configuration shown in FIG. 1 is illustrative and other computing device/system configurations are possible.

For example, the computing environment 10 shown in FIG. 1 may represent a single device such as a portable electronic device or the integration/cooperation of multiple electronic devices such as a client device and server device or a client device and a remote or offsite storage or processing entity or service. That is, the computing environment 10 may be implemented using any one or more electronic devices including standalone devices and those connected to offsite storage and processing operations (e.g., via cloud-based computing storage and processing facilities). For example, the document composition program 12 may be provided by an electronic device while a document storage 22 used by such a document composition program 12 may, at least in part, be stored and accessed from an external memory or application, including a cloud-based service or application.

The document composition program 12 is coupled to a display 14 to render and present/display user interface (UI) elements, UI components, and UI controls utilized by a UI rendered by the program 12, on the display 14. While examples referred to herein may refer to a single display 14 for ease of illustration, the principles discussed herein may also be applied to multiple displays 14, e.g., to view portions of UIs rendered by or with the document composition program 12 on separate side-by-side screens. That is, any reference to a display 14 may include any one or more displays 14 or screens providing similar visual functions. The document composition program 12 receives one or more inputs from one or more input devices 16, which may include or incorporate inputs made via the display 14 as illustrated in FIG. 1 as well as any other available input to the computing environment 10 (e.g., via the I/O interface 408 shown in FIG. 17), such as haptic or touch gestures, voice commands, eye tracking, biometrics, keyboard or button presses, etc. Such inputs may be applied by a user 18 interacting with the computing environment 10, e.g., by operating an electronic device or other computer system 400 having the display 14 and at least an interface to one or more input devices 16.

Figure 2:
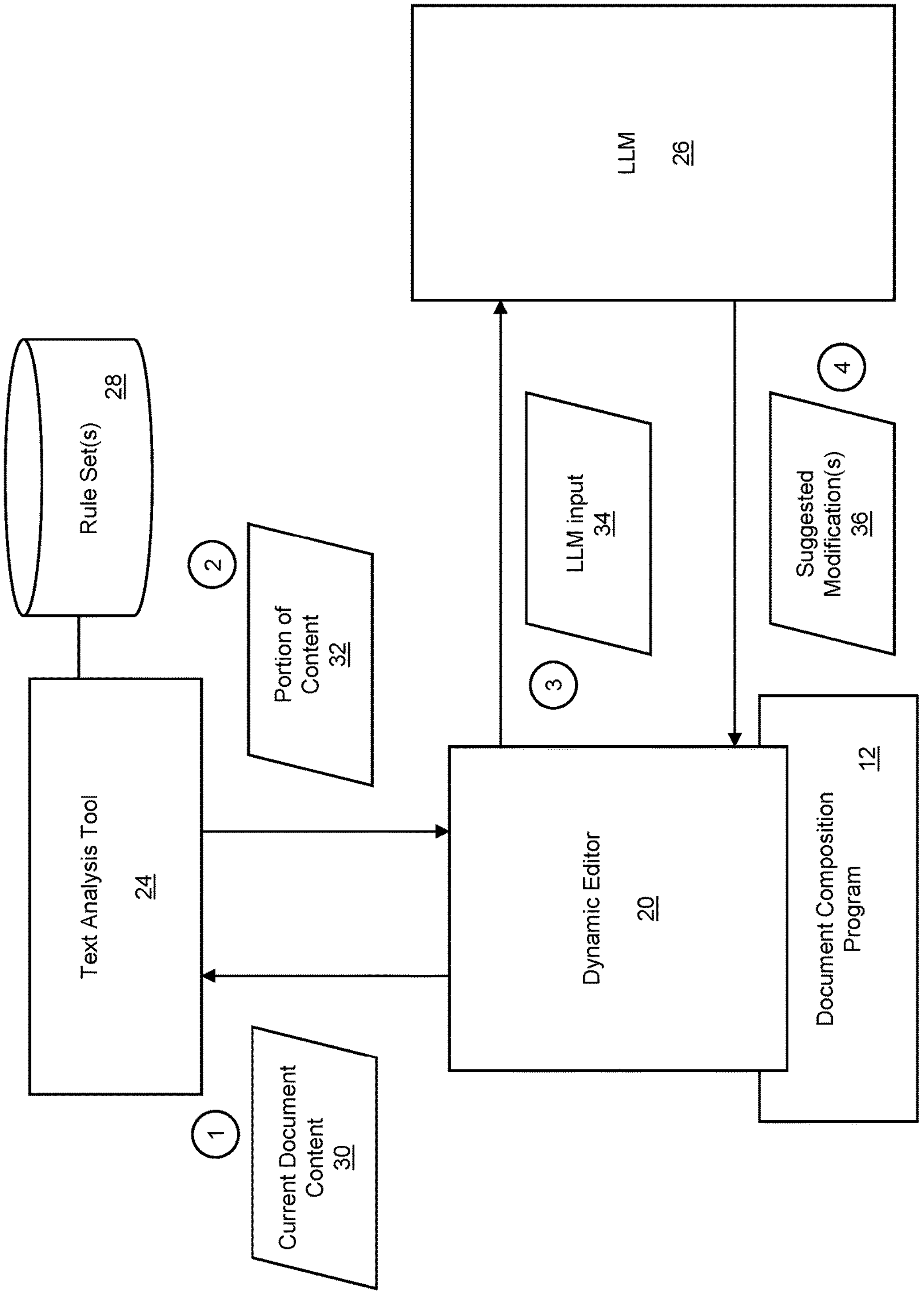
FIG. 2 is an example of a configuration for dynamic editor shown in FIG. 1.

FIG. 2 illustrates an example of a configuration for implementing a workflow executed by the dynamic editor 20 in connection with a document composition process being executed by the document composition program 12. The dynamic editor 20, as illustrated in FIG. 2, may be integrated with, coupled to, or otherwise in communication with the document composition program 12, and such varying integration may differ depending on the application or specific configuration. The dynamic editor 20 in this example configuration is shown as being coupled to or otherwise in communication with the text analysis tool 24 and the LLM 26. Such connections may be made via one or more communication networks (not shown). Such communication network(s) may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet). It can be appreciated that in configurations wherein the text analysis tool 24 and/or LLM 26 is/are integral to the document composition program 12 or is/are otherwise provided by the same computing device or computing system 400, the functionality of the communication network may instead be via a communication bus or logical/programmatical connection between the dynamic editor 20, the text analysis tool 24, and the LLM 26. The LLM 26 may be provided by a third party entity and would typically be made available over such a communication network.

In FIG. 2, at stage 1, the dynamic editor 20 may provide, or provide access to, current document content 30 to the text analysis tool 24. The current document content 30 may be a portion or the entire document. For example, the workflow shown in FIG. 2 may be applied successively to new portions of content as they are added such that the entire document content does not need to be analyzed by the text analysis tool 24 each time the text analysis tool 24 is used. When applied in real-time and periodically/continuously, the current document content 30 may represent portions or chunks of text (e.g., code) as it is added to the document.

At stage 2, a portion of the content 32 is returned or identified to the dynamic editor 20. The portion of content 32 corresponds to a portion of the document that is or includes a violation of a rule in a rule set 28. It can be appreciated that, as discussed later, the portion of content 32 may include a suggested modification generated by the text analysis tool 24, may include a prompt to have the dynamic editor 20 utilize the LLM 26 to generate a suggested modification, or both.

At stage 3, a LLM input 34, based on the portion of content 32, is provided to the LLM 26. The input 34 may include one or more prompts to instruct the LLM 26 to generate a suggested modification. The input 34 may therefore include the violation, a rule set, contextual information from within the document, additional information such as manuals or guidelines, third party data, metadata, etc.

At stage 4, the LLM 26 returns one or more suggested modifications 36 to the dynamic editor 20. The one or more suggested modifications 36 may be queued up, provided as an option, or automatically applied, as discussed in greater detail below. The dynamic editor 20 may continuously repeat these stages as the document is being composed or may rely on a user input to initiate the dynamic editor 20.

Figure 3:
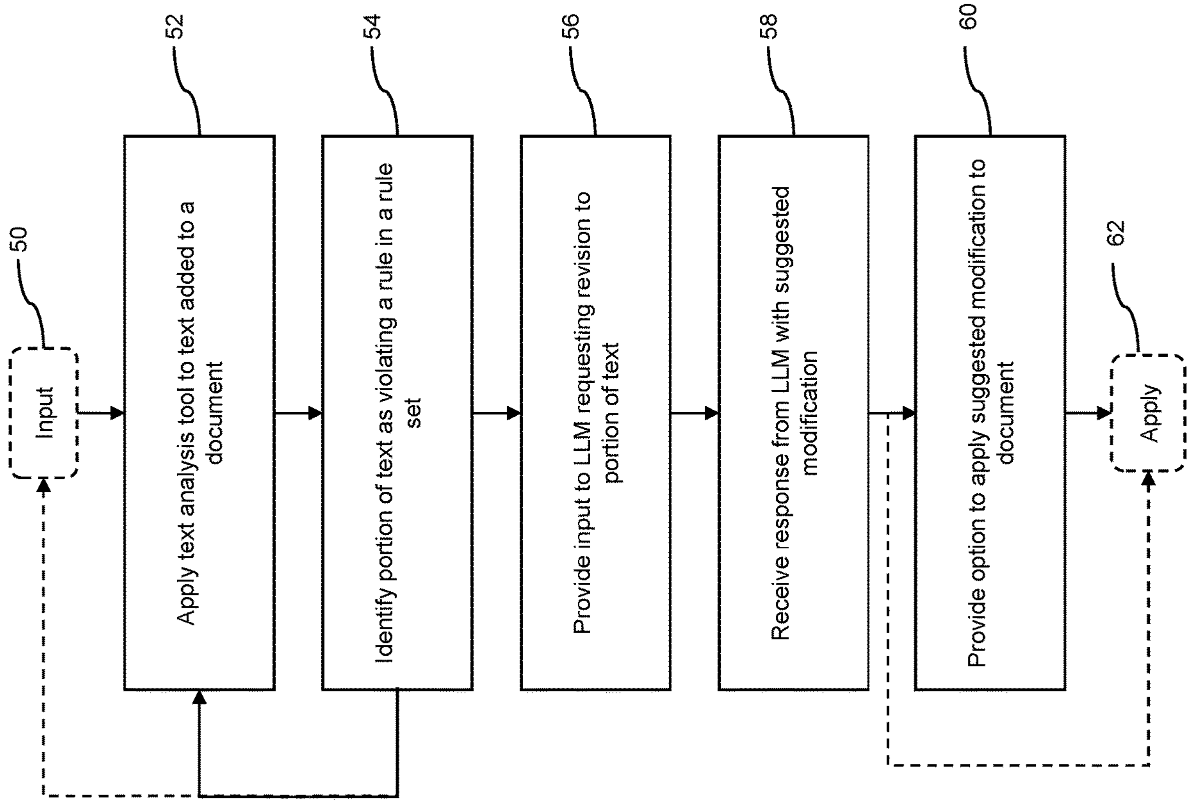
FIG. 3 is a flow chart illustrating example operations for dynamically modifying textual content by applying a text analysis tool and selectively using the LLM.

Referring now to FIG. 3, a flow chart is provided illustrating example operations for dynamically modifying textual content by applying a text analysis tool and selectively using a LLM 26. The operations shown in FIG. 3 may be implemented by an electronic device (e.g., computing system 400 shown in FIG. 17), a server, or other computing device or computing entity in the computing environment 10. In FIG. 3, blocks 50 and 62 are shown in dashed lines to indicate that these operations may be optional or otherwise performed by another entity or provided in other data and information rather than being performed as part of the illustrated method.

At block 50, an input is detected. As indicated above, such an input may not be required to initiate usage of the dynamic editor 20 since the dynamic editor 20 may be initiated automatically on a periodic basis, including on a continuous basis. At block 52, the dynamic editor 20 initiates or otherwise accesses and applies the text analysis tool 24 to text that has been added to a document, e.g., the current document content 30 shown in FIG. 2. The text analysis tool 24 may be successively applied to portions of content within the document or may be applied to the entire document contents when utilized.

At block 54, the text analysis tool 24 identifies a portion of text (e.g., portion of content 32 shown in FIG. 2) as violating one or more rules in a rule set 28. For example, the text analysis tool 24 may flag a portion of text that it identifies as a command that has not been bolded by the user, has not been capitalized, includes a syntax error, includes a spelling or grammatical error, etc. While in some cases, the text analysis tool 24 may include the necessary logic to successfully provide and apply a suggested modification (e.g., in the case of a spelling error), some violations such as those dictated by guidelines that are not necessarily straightforward may require additional analysis.

At block 56, to apply such additional analysis, the dynamic editor 20 may generate and provide an input to the LLM 26, the input requesting a revision to a portion of the text associated with the violation. As discussed in greater detail later, the input may include various amounts of textual content and context as appropriate and may be configured as one or more LLM prompts or LLM instructions. For example, the input to the LLM 26 may include a portion of text that violates a rule stemming from a guideline, which cannot be automatically deciphered by the text analysis tool 24. In this example, it may not be clear to the text analysis tool 24 whether text entered in a code editor should be capitalized since that would depend on additional context such as whether the code being written is for a mobile app or desktop application where the terms "tap" versus "click" would be used differently. The dynamic editor 20 may thus generate an input to the LLM 26 that provides additional context such as additional content from the document, metadata, or portions of the guidelines or rule sets 28 themselves.

At block 58, the dynamic editor 20 receives a response from the LLM 26 with at least one suggested modification. The suggested modification may be provided to the user as an option at block 60 or may be immediately applied automatically at block 62 as shown in FIG. 3. When provided as an option at block 60, the user may be given an opportunity to review and confirm the acceptability of the suggested modification, similar to how a spelling or grammar error may be highlighted/flagged and fixes applied while the document is being composed. In such cases, the suggested modification may be applied at block 62 responsive to an input selecting the corresponding option.

Figure 4:
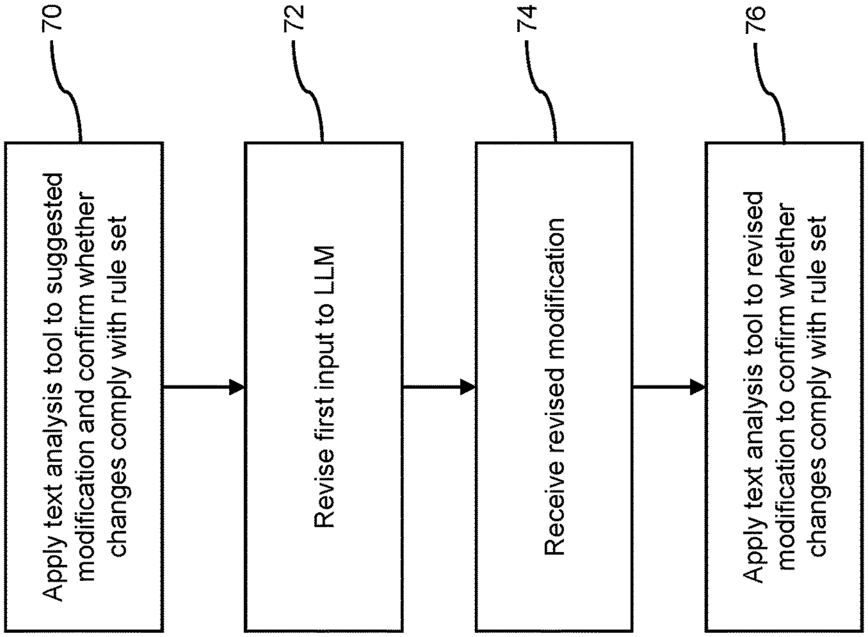
FIG. 4 is a flow chart illustrating example operations for applying a text analysis tool to a suggested modification generated by the LLM.

Referring now to FIG. 4, a flow chart is provided illustrating example operations for applying the text analysis tool 24 to a suggested modification generated by the LLM 26. At block 70, responsive to receiving a suggested modification from the LLM 26 (e.g., at block 58 in FIG. 3), the text analysis tool 24 may be applied to the suggested modification to confirm whether any suggested changes comply with the rule set(s) 28. In the example shown in FIG. 4, it is assumed that the text analysis tool 24 identifies an issue with the suggested modification, for example, that a different rule is violated or that the change does not fix the original violation.

At block 72, the first input to the LLM 26 (e.g., what was generated and provided at block 56 in FIG. 3) may be revised, which may include formulating a new input to the LLM 26 and sending the revised input to the LLM 26. The dynamic editor 20 may receive a revised modification at block 74. The text analysis tool 24 may again be applied to the revised modification at block 76 to confirm whether the changes comply with the rule set(s) 28.

That is, the text analysis tool 24 may be recursively applied to modifications suggested by the LLM 26 to converge on a suggested modification that complies with the rule set(s) 28 applicable to the document being composed. It can be appreciated that the revised input to the LLM 26 that is generated at block 72 may include different prompts, additional prompts, or the provision of additional content or metadata.

The nature and amount of additional data and/or information used to revise the LLM prompt(s) may be determined automatically by the dynamic editor 20, may be requested by the LLM 26, may include at least some manual input from a user, or some combination of any of these operations.

Figure 5:
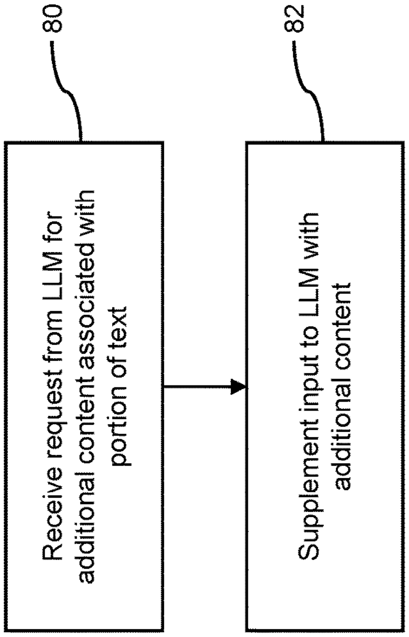
FIG. 5 is a flow chart illustrating example operations for supplementing an input to the LLM with additional content.

Referring now to FIG. 5, a flow chart is provided illustrating example operations for supplementing an input to the LLM 26 with additional content. At block 80, a request for additional content associated with the portion of text is received from the LLM 26. That is, the portion of text which contains the violation may not provide the LLM 26 with enough context or raw data to generate a suggested modification. For example, the LLM 26 may require additional content from the document or the entire document in order to determine an appropriate suggested modification.

At block 82, the input to the LLM 26 may be supplemented with additional content. For example, responsive to prompting the LLM 26 with the original input (e.g., at block 56 of FIG. 3), the LLM 26 may indicate that additional content is required. An asynchronous process may then be implemented in the background while the document continues to be composed and edited wherein the LLM 26 is re-prompted with the additional content added to the input. In this way, the LLM 26 may asynchronously refine its answer to the input to converge on a best or most desirable answer, based on additional context.

Figure 6:
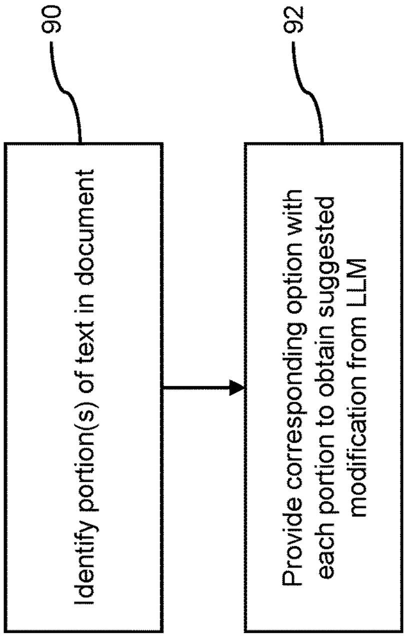
FIG. 6 is a flow chart illustrating example operations for providing options for portions of text in a document to obtain a suggested modification from the LLM.

Referring now to FIG. 6, a flow chart is provided illustrating example operations for providing options for portions of text in a document to obtain a suggested modification from the LLM 26. At block 90, one or more portions of text is/are identified within the document. For example, if the dynamic editor 20 is initiated by a manual input, the text analysis tool 24 may have several portions of the document to review and identify violations such that the document includes multiple highlighted violations at the same time. That is, the dynamic editor 20 may continuously identify and flag/highlight violations without disrupting the user's ability to compose new text or edit existing text.

At block 92, a corresponding option for a suggested modification generated by the LLM 26 may be provided with each of the multiple portions of text that have been flagged as having a violation. In this way, the user may selectively address multiple violations in any desired order. Each violation may have multiple suggested modifications, for example, one or more generated by the text analysis tool 24 and one or more generated by the LLM 26.

Figure 7:
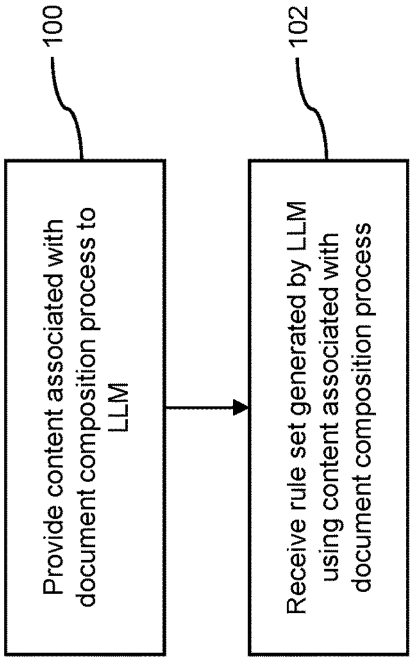
FIG. 7 is a flow chart illustrating example operations for generating a rule set by providing content associated with a document composition process to the LLM.

Referring now to FIG. 7, a flow chart is provided illustrating example operations for generating a rule set 28 by providing content associated with a document composition process to the LLM 26. For example, the rule set 28 used by the text analysis tool 24 may be generated by the LLM 26 automatically based on a set of guidelines or documentation related to the document composition process such as a set of guidelines for computer code generation. At block 100 content associated with the document composition process such as guidelines that should be followed when composing or editing text.

At block 102, a rule set 28 generated by the LLM 26, using such content, is received. The rule set 28 may then be subsequently used by the text analysis tool 24 and/or the LLM 26 itself when detecting violations and providing suggested modifications.

It can be appreciated that in any of the above examples that include a suggested modification to a document that is provided and subsequently applied, the dynamic editor 20 may generate a precedent that is used later in the document to existing text or to new text that will be added. That is, by determining a violation that may be repeated, the dynamic editor 20 may reduce the number of calls to the text analysis tool 24 and/or LLM 26 by predictively making similar changes. These predictive changes may be applied automatically or be prompted to the user and require confirmation from the user.

Referring now to FIGS. 8 to 13, various example user interfaces (UIs) are shown to illustrate how the dynamic editor 20 may operate in a document composition process during creating and/or editing of a document.

Figure 8A:
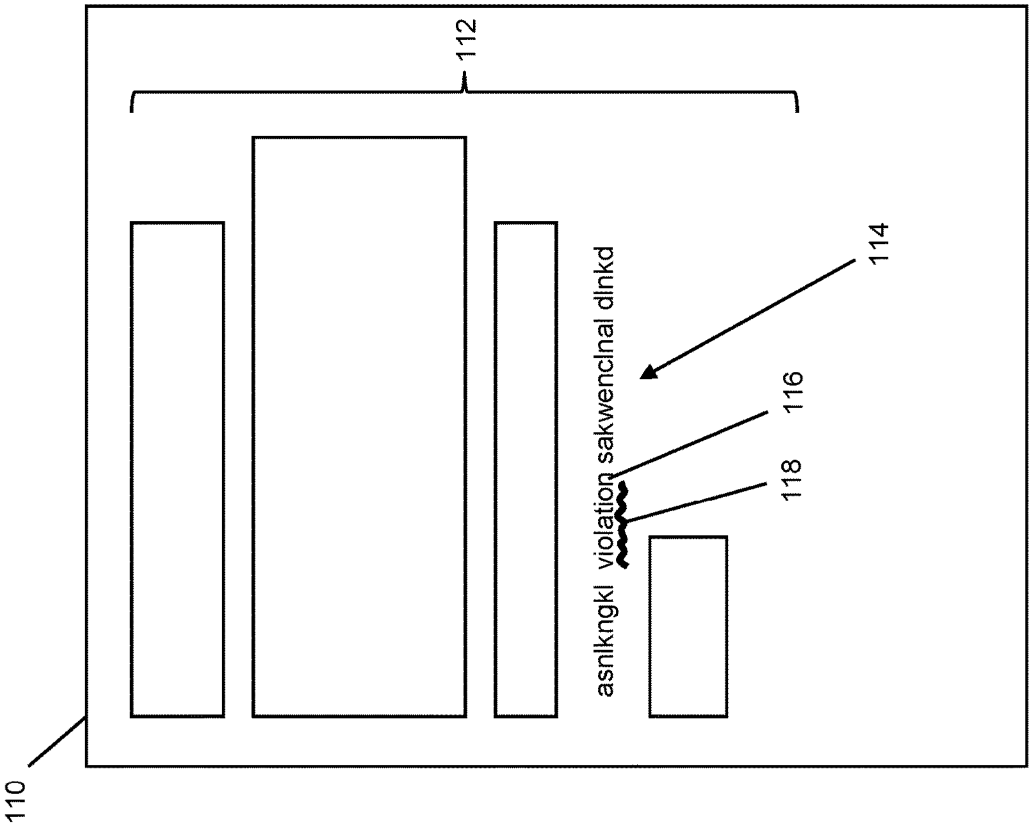
FIG. 8*a* shows an example of a document composition user interface showing a highlighted violation to a rule in a rule set.
Figure 8B:
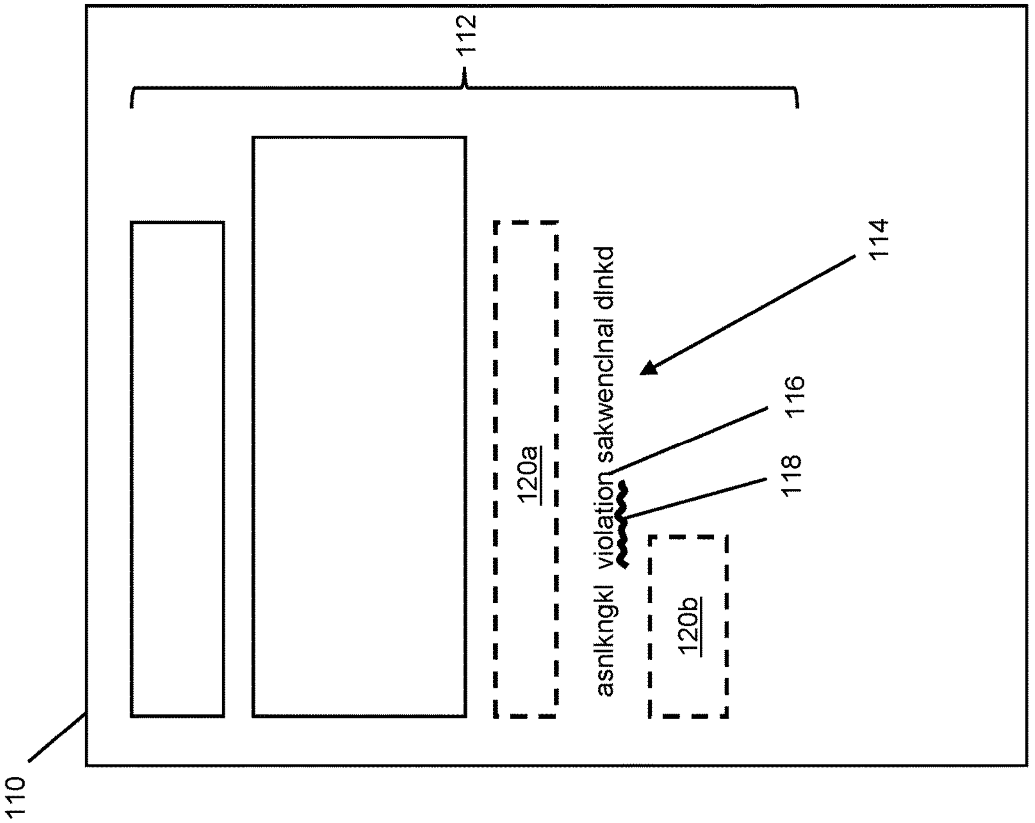
FIG. 8*b* shows an example of the document composition user interface of FIG. 8*b* to illustrate capturing contextual content for obtaining a suggested modification from the LLM.

In FIG. 8*a*, a document composition UI 110 is shown, e.g., for generating a document such as computer code. The UI 110 includes a number of portions of text 112, e.g., blocks of code being written for an application. A particular portion of text 114 is shown, which includes a violation 16 as indicated or highlighted by an underlining 118 applied to, or in association with, the violation 16. In FIG. 8*b*, additional, potentially related content 120*a*, 120*b* is shown as being identified using dashed lines. The dashed lines are shown in FIG. 8*b* as a visual for this disclosure and would not necessarily be seen by a user. That is, FIG. 8*b* illustrates that some content surrounding or otherwise associated with the violation 116 may be considered either by the text analysis tool 24, the LLM 26, or both.

Figure 9:
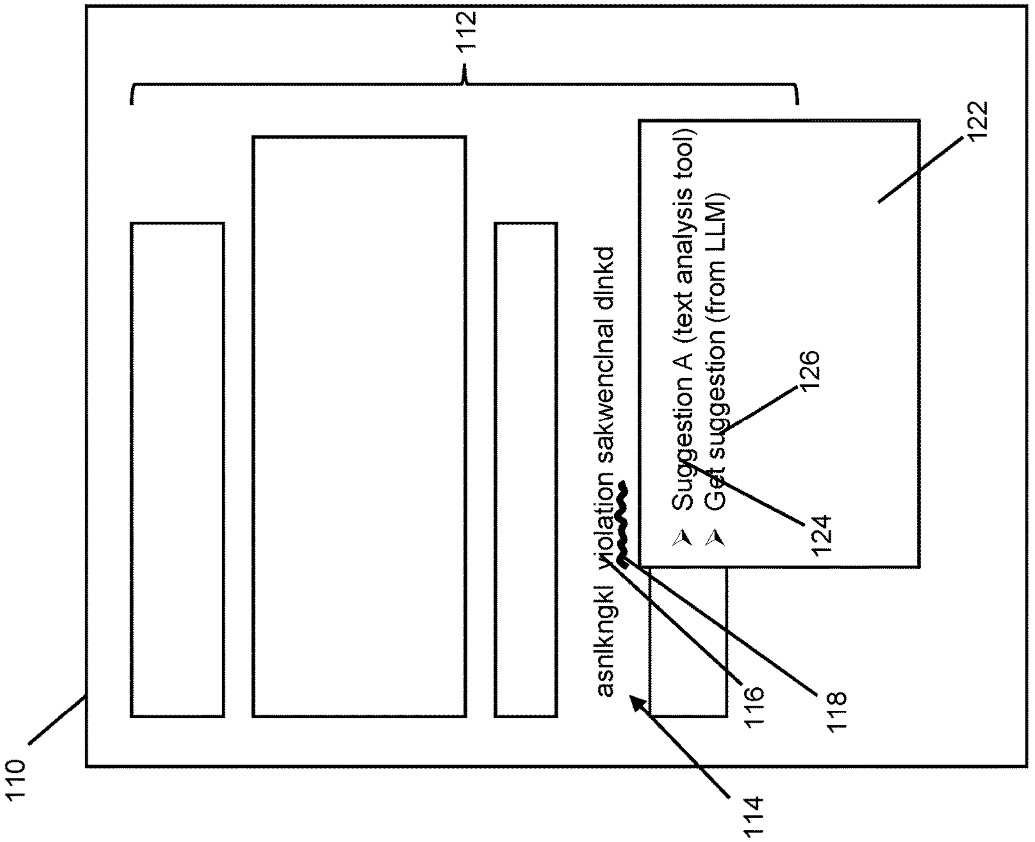
FIG. 9 shows an example of a document composition user interface providing an option to address the violation using the text analysis tool and an option to address the violation by getting a suggested modification from the LLM.

FIG. 9 illustrates a drop-down menu 122 that may be displayed in association with the violation 16. For example, the drop-down menu 122 may be displayed responsive to a user selecting or hovering over the underlining 18 or the text that has been underlined and is thus associated with the violation 118. In this example, the first option 124, identified as "Suggestion A" provides a suggested edit determined by the text analysis tool 24. The second option 126, identified as "Get suggestion", provides an option to obtain a suggested modification from the LLM 26, e.g., when Suggestion A is not selected by the user. For example, the violation 116 may include a spelling error identified by the text analysis tool 24 that is determined to be a violation unrelated to spelling, for example, syntax. In this case, the misspelling is not the issue but rather a function that should be capitalized. The user may identify that the spelling is not the issue and select the second option 126 to get a suggestion from the LLM 26 or this may be applied automatically.

Figure 10:
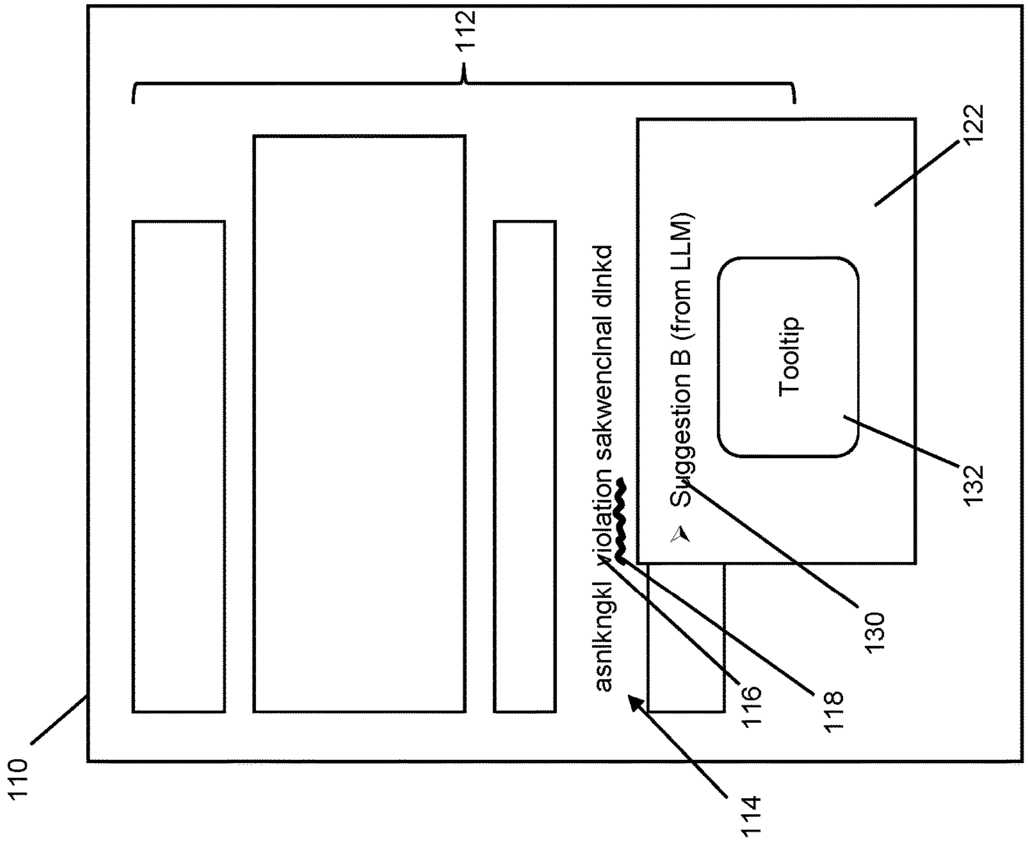
FIG. 10 shows an example of a document composition user interface providing a suggested option obtained by prompting the LLM.

As shown in FIG. 10, the drop-down menu 122 may include only the suggested modifications obtained from the LLM 26, in this example, Suggestion B identified by numeral 130. The drop-down menu 122 may also include a tooltip 132 or other additional information that explains the violation and/or the remedy to inform the user prior to selecting Suggestion B.

Figure 11:
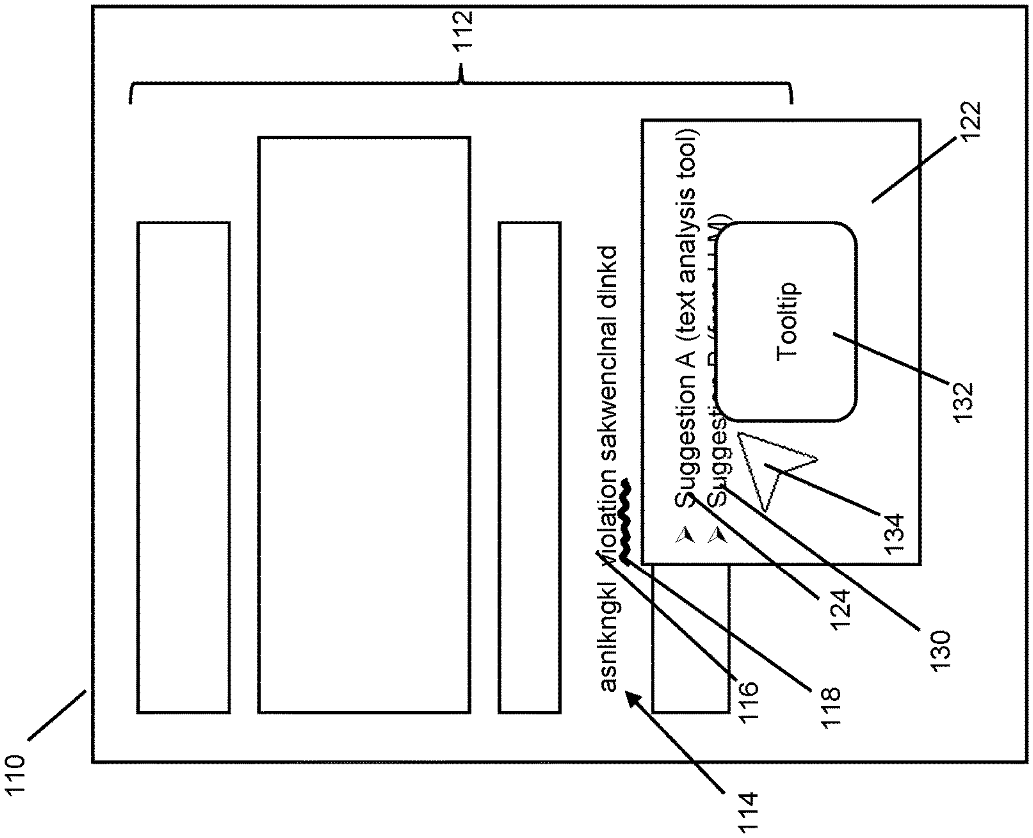
FIG. 11 shows an example of a document composition user interface providing an option to address the violation using the text analysis tool, an option to address the violation using a suggested modification from the LLM, and a tooltip associated with a selected option.

FIG. 11 illustrates that Suggestion A (first option 124) and Suggestion B (second option 130) may be presented together in the drop-down menu 122, with a corresponding tooltip 132 displayed when the user selects or hovers a cursor 134 over the desired suggestion 124, 130.

Figure 12:
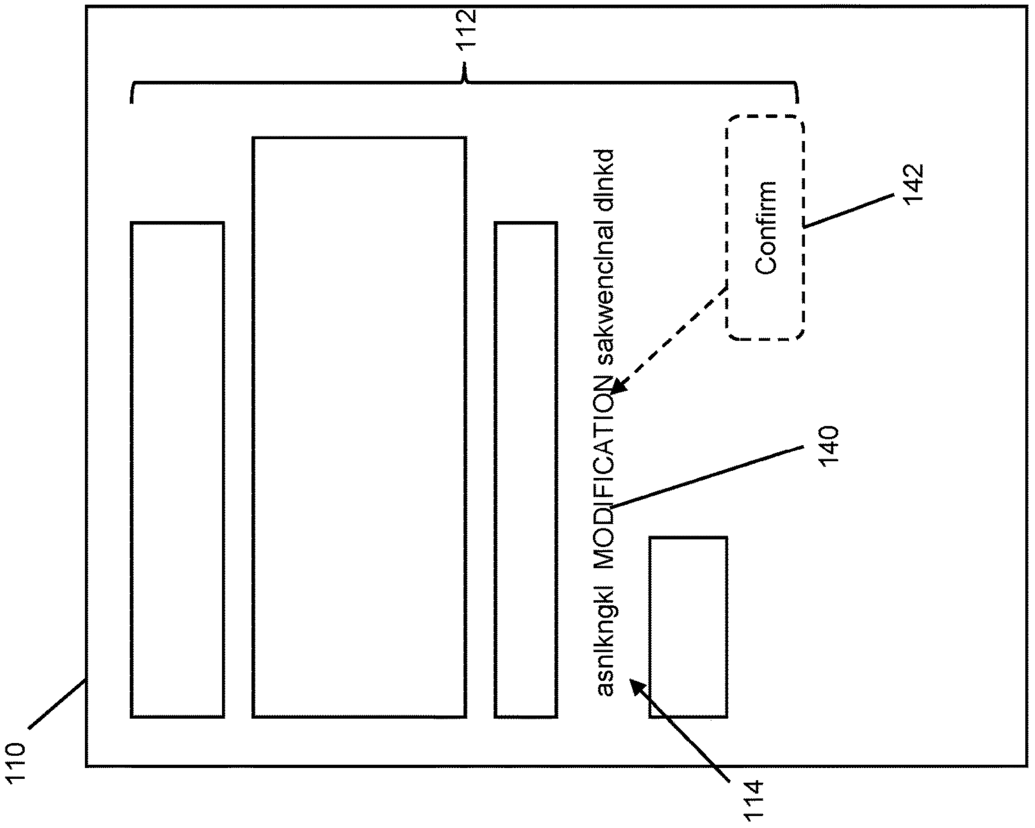
FIG. 12 shows an example of a document composition user interface showing a modification applied to a portion of text that includes the violation.

Referring to FIG. 12, a selected modification 140 (identified as "MODIFICATION") is shown in place of the violation 116 previously entered and highlighted by the dynamic editor 120. Optionally, as shown in dashed lines, a confirmation 142 may be required to accept the modification.

Figure 13:
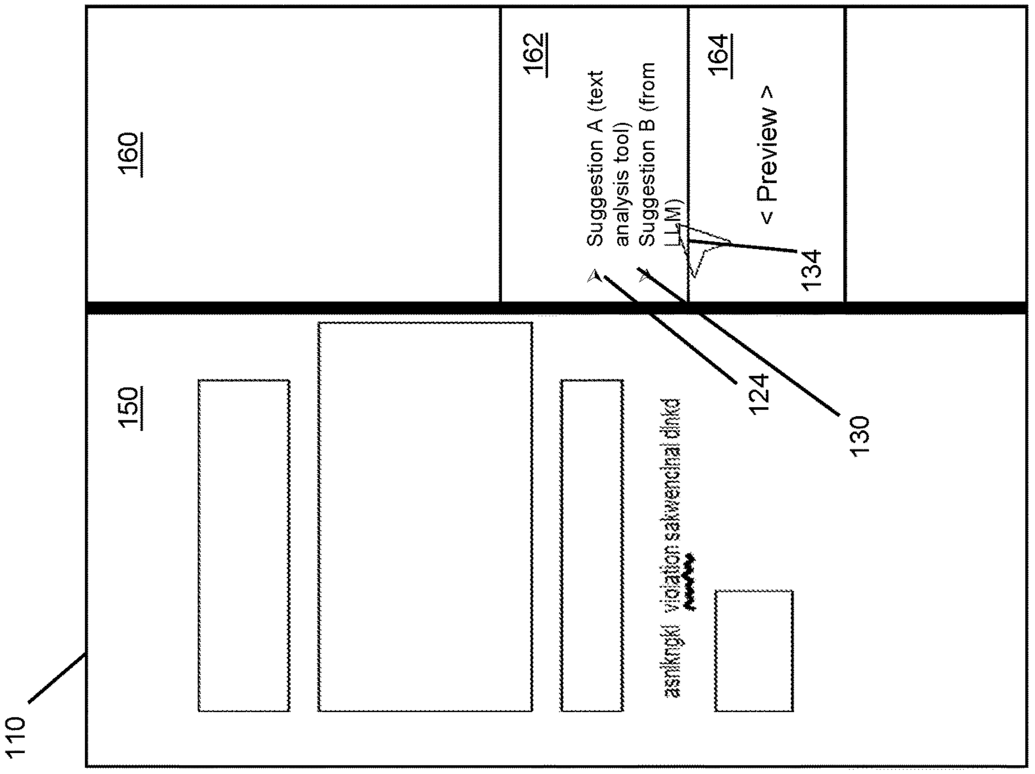
FIG. 13 shows an example of a document composition user interface showing a preview pane alongside a document composition portion.

It can be appreciated that the UI 110 may be adapted in various ways to provide suggested modifications and to preview the modifications themselves. For example, as shown in FIG. 13, a preview pane 160 may be displayed alongside a document composition area 150. The preview pane 160 in this example includes a list of options 162 for suggested modifications (provided by the text analysis tool 24, LLM 26 or both) and a preview 164 of the modification. The preview 164 may correspond to the position of the cursor 134 as illustrated in FIG. 13. The preview pane 160 may be selectively displayed and hidden by user selection and/or may appear and disappear based on another cue such as hovering over a violation 116 or in response to an input. The preview pane 160 may instead be provided using a tabbed menu and/or be selectively accessible in the UI 110.

Figure 14:
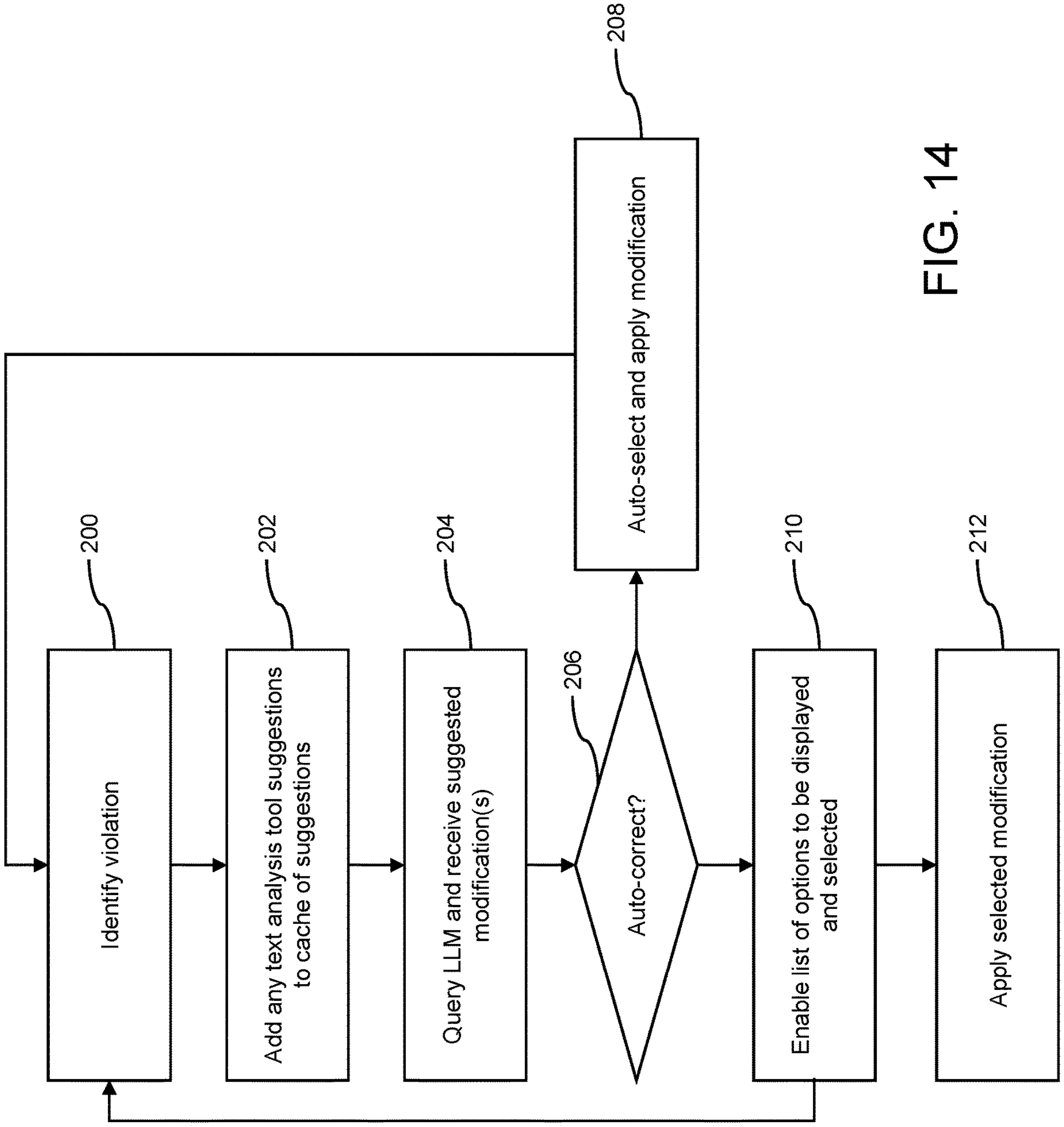
FIG. 14 is a flow chart illustrating example operations for queuing and applying suggested modifications to violations to a rule set in a document composition process.

Referring now to FIG. 14, a flow chart is provided illustrating example operations for queuing and applying suggested modifications to violations 116 to a rule set 28 in a document composition process. The operations shown in FIG. 14 illustrate an example of how to asynchronously utilize the LLM 26 without disrupting the document composition process. At block 200, the dynamic editor 20 identifies a violation 116. When a violation 116 is identified, the dynamic editor 20 may first determine if the text analysis tool 24 has any suggested modifications and adds them to a cache of suggestions at 202.

At block 204, the dynamic editor 20 may query the LLM 26 and receive one or more suggested modifications from the LLM 26. The dynamic editor 20 may then determine at block 206 whether to automatically correct the violation 116 using the suggested modification provided by the LLM 26. If so, the suggested modification may be applied at block 208 and the dynamic editor 20 continue to monitor the text in the document by returning to block 200.

If the suggested modification provided by the LLM 26 is not to be automatically corrected, the dynamic editor 20 may enable a list of options to be displayed and selected at block 210. That is, the list of options may be displayed either automatically (e.g., in preview pane 160) or upon request by displaying the drop-down menu 122 in response to a user input.

At block 212, the modification selected from the list of options is applied, e.g., to correct the violation 116 using the modification 140 as shown in FIG. 12.

Accordingly, a text analysis tool 24 (e.g., linter or other code analysis tool) may be used with a LLM 26 to identify and correct violations during document composition. The text analysis tool 24 may execute during composition to detect and highlight violations and, when appropriate, provide an option to selectively prepare and feed LLM instructions in order to query the LLM 26 and determine relevant corrections in response thereto.

Neural Networks and Machine Learning

To assist in understanding the present disclosure, some concepts relevant to neural networks and machine learning (ML) are discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 15:
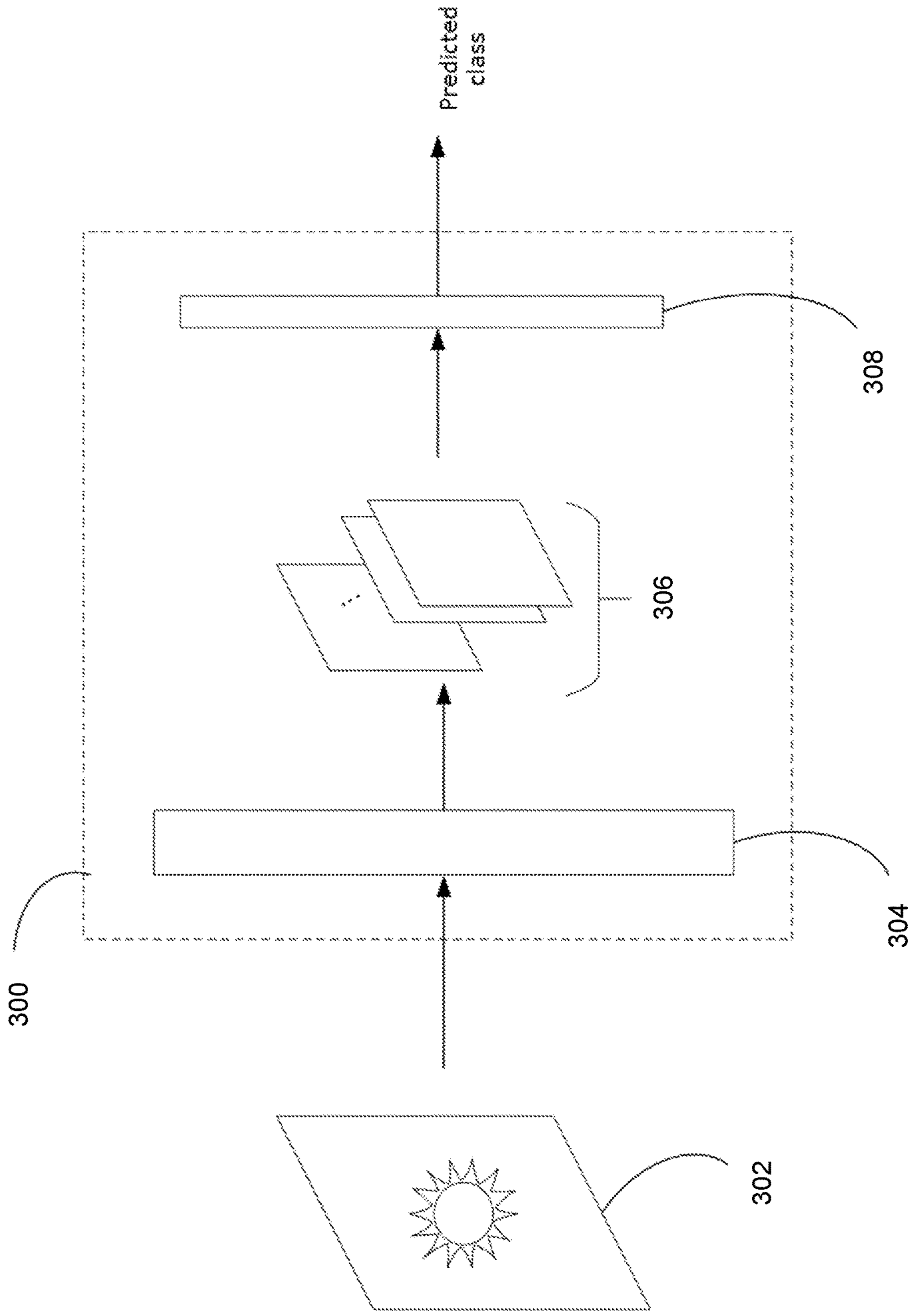
FIG. 15 is a block diagram of a simplified convolutional neural network, which may be used in examples of the present disclosure.

FIG. 15 is a simplified diagram of an example CNN 300, which is an example of a DNN that is commonly used for image processing tasks such as image classification, image analysis, object segmentation, etc. An input to the CNN 300 may be a 2D RGB image 302.

The CNN 300 includes a plurality of layers that process the image 302 in order to generate an output, such as a predicted classification or predicted label for the image 302. For simplicity, only a few layers of the CNN 300 are illustrated including at least one convolutional layer 304. The convolutional layer 304 performs convolution processing, which may involve computing a dot product between the input to the convolutional layer 304 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 304 is a set of feature maps 306 (sometimes referred to as activation maps). Each feature map 306 generally has smaller width and height than the image 302. The set of feature maps 306 encode image features that may be processed by subsequent layers of the CNN 300, depending on the design and intended task for the CNN 300. In this example, a fully connected layer 308 processes the set of feature maps 306 in order to perform a classification of the image, based on the features encoded in the set of feature maps 306. The fully connected layer 308 contains learned parameters that, when applied to the set of feature maps 306, outputs a set of probabilities representing the likelihood that the image 302 belongs to each of a defined set of possible classes. The class having the highest probability may then be outputted as the predicted classification for the image 302.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a LLM may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 16:
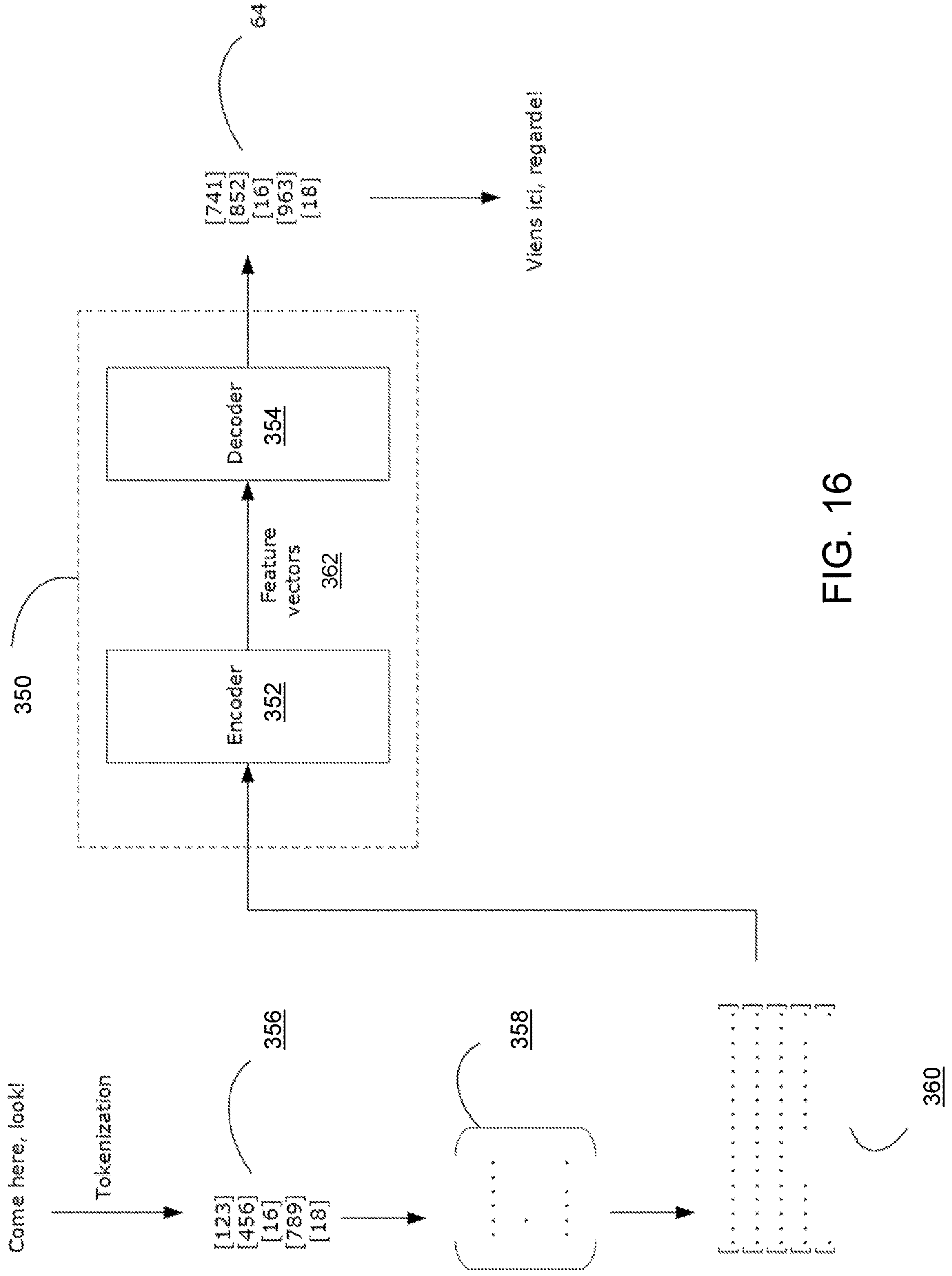
FIG. 16 is a block diagram of a simplified transformer neural network, which may be used in examples of the present disclosure.

FIG. 16 is a simplified diagram of an example transformer 350, and a simplified discussion of its operation is now provided. The transformer 350 includes an encoder 352 (which may comprise one or more encoder layers/blocks connected in series) and a decoder 354 (which may comprise one or more decoder layers/blocks connected in series). Generally, the encoder 352 and the decoder 354 each include a plurality of neural network layers, at least one of which may be a self-attention layer. The parameters of the neural network layers may be referred to as the parameters of the language model.

The transformer 350 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 350 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 16, a short sequence of tokens 356 corresponding to the text sequence "Come here, look!" is illustrated as input to the transformer 350. Tokenization of the text sequence into the tokens 356 may be performed by some pre-processing tokenization module such as, for example, a byte pair encoding tokenizer (the "pre" referring to the tokenization occurring prior to the processing of the tokenized input by the LLM), which is not shown in FIG. 16 for simplicity. In general, the token sequence that is inputted to the transformer 350 may be of any length up to a maximum length defined based on the dimensions of the transformer 350 (e.g., such a limit may be 2048 tokens in some LLMs). Each token 356 in the token sequence is converted into an embedding vector 360 (also referred to simply as an embedding). An embedding 360 is a learned numerical representation (such as, for example, a vector) of a token that captures some semantic meaning of the text segment represented by the token 356. The embedding 360 represents the text segment corresponding to the token 356 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 360 corresponding to the "look" token will be closer to another embedding corresponding to the "see" token in the vector space, as compared to the distance between the embedding 360 corresponding to the "look" token and another embedding corresponding to the "cake" token. The vector space may be defined by the dimensions and values of the embedding vectors. Various techniques may be used to convert a token 356 to an embedding 360. For example, another trained ML model may be used to convert the token 356 into an embedding 360. In particular, another trained ML model may be used to convert the token 356 into an embedding 360 in a way that encodes additional information into the embedding 360 (e.g., a trained ML model may encode positional information about the position of the token 356 in the text sequence into the embedding 360). In some examples, the numerical value of the token 356 may be used to look up the corresponding embedding in an embedding matrix 358 (which may be learned during training of the transformer 350).

The generated embeddings 360 are input into the encoder 352. The encoder 352 serves to encode the embeddings 360 into feature vectors 362 that represent the latent features of the embeddings 360. The encoder 352 may encode positional information (i.e., information about the sequence of the input) in the feature vectors 362. The feature vectors 362 may have very high dimensionality (e.g., on the order of thousands or tens of thousands), with each element in a feature vector 362 corresponding to a respective feature. The numerical weight of each element in a feature vector 362 represents the importance of the corresponding feature. The space of all possible feature vectors 362 that can be generated by the encoder 352 may be referred to as the latent space or feature space.

Conceptually, the decoder 354 is designed to map the features represented by the feature vectors 362 into meaningful output, which may depend on the task that was assigned to the transformer 350. For example, if the transformer 350 is used for a translation task, the decoder 354 may map the feature vectors 362 into text output in a target language different from the language of the original tokens 356. Generally, in a generative language model, the decoder 354 serves to decode the feature vectors 362 into a sequence of tokens. The decoder 354 may generate output tokens 364 one by one. Each output token 364 may be fed back as input to the decoder 354 in order to generate the next output token 364. By feeding back the generated output and applying self-attention, the decoder 354 is able to generate a sequence of output tokens 364 that has sequential meaning (e.g., the resulting output text sequence is understandable as a sentence and obeys grammatical rules). The decoder 354 may generate output tokens 364 until a special [EOT] token (indicating the end of the text) is generated. The resulting sequence of output tokens 364 may then be converted to a text sequence in post-processing. For example, each output token 364 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

FIG. 17 illustrates an example computing system 400, which may be used to implement examples of the present disclosure, such as a prompt generation engine to generate prompts to be provided as input to a language model such as a LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein. For example, the memory 404 may store instructions for implementing the document composition program 12, dynamic editor 20, text analysis tool 24, and LLM 26. The memory 404 may also include the document storage 22 and/or storage for the rule set(s) 28.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 17, may access a remote system (e.g., a cloud-based system) to communicate with a remote language model or LLM 26 hosted on the remote system such as, for example, using an application programming interface (API) call. The API call may include an API key to enable the computing system to be identified by the remote system. The API call may also include an identification of the language model or LLM 26 to be accessed and/or parameters for adjusting outputs generated by the language model or LLM 26, such as, for example, one or more of a temperature parameter (which may control the amount of randomness or "creativity" of the generated output) (and/or, more generally some form of random seed as serves to introduce variability or variety into the output of the LLM 26), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM 26 and the output (e.g., token sequence) generated by the language model or LLM 26 is communicated back to the computing system. In other examples, the prompt may be provided directly to the language model or LLM 26 without requiring an API call. For example, the prompt could be sent to a remote LLM 26 via a network such as, for example, as or in message (e.g., in a payload of a message).

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, any entity within the computing environment 10 such as the computing system 400, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:

applying a text analysis tool to text having been added to a document;

identifying a portion of the text having been added to the document as violating a rule in a rule set associated with the document;

responsive to identifying the portion of the text, providing a first input to a large language model (LLM), the first input comprising at least one prompt requesting a revision to the portion of text having been added to the document;

receiving, from the LLM, a response to the first input, the response comprising a suggested modification to the document related to the portion of text; and responsive to receiving the response to the first input, providing an option to apply the suggested modification to the document.

2. The method of claim 1, wherein the text analysis tool is applied continuously, periodically, or responsive to a second input during document composition.

3. The method of claim 1, further comprising applying the suggested modification to the document.

4. The method of claim 3, wherein the suggested modification is applied responsive to a third input confirming the suggested modification.

5. The method of claim 3, further comprising applying the text analysis tool to the suggested modification to confirm that changes comply with the rule set.

6. The method of claim 5, further comprising:

revising the first input to the LLM;

receiving a revised modification; and applying the text analysis tool to the revised modification to confirm that changes comply with the rule set.

7. The method of claim 1, further comprising:

receiving a request from the LLM for additional content associated with the portion of text; and supplementing the input with the additional content.

8. The method of claim 1, further comprising updating the rule set based on the suggested modification.

9. The method of claim 2, wherein the method is executed asynchronously to document composition.

10. The method of claim 1, further comprising:

identifying one or more portions of text in the document; and providing a corresponding option with each portion to obtain the suggested modification from the LLM.

11. The method of claim 10, wherein the portion of text is highlighted inline and detecting selection of the highlighted text causes the text analysis tool to display the corresponding option.

12. The method of claim 11, wherein a plurality of corresponding options is displayed, each option providing a different suggested modification.

13. The method of claim 1, wherein the modification to the document comprises a replacement for the portion of text.

14. The method of claim 1, wherein the modification to the document comprises content additional to the portion of text.

15. The method of claim 1, further comprising:

providing content associated with the document composition process to the LLM; and receiving the rule set, the rule set having been generated by the LLM using the content associated with the document composition process.

16. The method of claim 1, further comprising receiving, from the LLM, a prediction for a new portion of text to be added to the document based on an analysis of the input.

17. A computer system comprising:

at least one processor; and at least one memory, the at least one memory comprising processor executable instructions that, when executed by the at least one processor, cause the computer system to:

apply a text analysis tool to text having been added to a document;

identify a portion of the text having been added to the document as violating a rule in a rule set associated with the document;

responsive to identifying the portion of the text, provide a first input to a large language model (LLM), the first input comprising at least one prompt requesting a revision to the portion of text having been added to the document;

receive, from the LLM, a response to the first input, the response comprising a suggested modification to the document related to the portion of text; and responsive to receiving the response to the first input, provide an option to apply the suggested modification to the document.

18. The system of claim 17, wherein the text analysis tool is applied continuously, periodically, or responsive to a second input during document composition.

19. The system of claim 17, further comprising instructions that, when executed by the at least one processor, cause the computer system to:

apply the suggested modification to the document.

20. A computer-readable medium comprising processor executable instructions that, when executed by a processor of a computer system, cause the computer system to:

apply a text analysis tool to text having been added to a document;

identify a portion of the text having been added to the document as violating a rule in a rule set associated with the document;

responsive to identifying the portion of the text, provide a first input to a large language model (LLM), the first input comprising at least one prompt requesting a revision to the portion of text having been added to the document;

receive, from the LLM, a response to the first input, the response comprising a suggested modification to the document related to the portion of text; and responsive to receiving the response to the first input, provide an option to apply the suggested modification to the document.

* * * * *